United States Patent [19]

Entenmann et al.

[11] Patent Number: 5,551,235
[45] Date of Patent: Sep. 3, 1996

[54] SYSTEM FOR THE CLOSED-LOOP CONTROL OF THE SUPERCHARGING OF AN INTERNAL-COMBUSTION ENGINE

[75] Inventors: Robert H. Entenmann, Benningen; Stefan Unland, Schwieberdingen; Matthias Philipp, Stuttgart; Werner Haeming, Neudenau; Iwan Surjadi, Vaihingen, all of Germany; Ulrich Rothhaar, Milan, Italy; Michael Baeuerle, Besigheim, Germany

[73] Assignee: Robert Bosch GmbH, Stuttgart, Germany

[21] Appl. No.: 363,178

[22] Filed: Dec. 23, 1994

[30] Foreign Application Priority Data

Dec. 30, 1993 [DE] Germany ............... 43 44 960.3

[51] Int. Cl.$^6$ .................................................. F02B 37/12
[52] U.S. Cl. ........................................................... 60/602
[58] Field of Search .............................. 60/600, 601, 602, 60/603; 123/564

[56] References Cited

U.S. PATENT DOCUMENTS

| | | | |
|---|---|---|---|
| 4,660,382 | 4/1987 | Ueno et al. | 60/602 |
| 4,671,067 | 6/1987 | Abo et al. | 60/602 |
| 5,123,246 | 6/1992 | Younessi et al. | 60/602 |

FOREIGN PATENT DOCUMENTS

| | | | |
|---|---|---|---|
| 084037 | 7/1983 | European Pat. Off. . | |
| 3303350 | 8/1984 | Germany | 60/602 |
| 4219791 | 12/1993 | Germany . | |

Primary Examiner—Michael Koczo
Attorney, Agent, or Firm—Kenyon & Kenyon

[57] ABSTRACT

In a system for the closed-loop control of the supercharging of an internal-combustion engine, a manipulated variable is produced by means of a controller in dependence upon the deviation between a desired supercharging and an actual supercharging. With this manipulated variable, a final controlling element is triggered, which influences the supercharging of the internal-combustion engine. The controller parameters of the controller are repeatedly optimized. To this end, a model for the internal-combustion engine is specified, inclusive of a charging device, and the model parameters are determined from the manipulated variable and the actual supercharging. Controller parameters are determined from the model parameters and relayed to the controller. Moreover, in certain operating states, the controller parameters are stored in start-up characteristic maps. The start-up characteristic maps supply the initial values for the controller parameters each time the closed-loop control is activated.

10 Claims, 2 Drawing Sheets

SYSTEM FOR THE CLOSED-LOOP CONTROL OF THE SUPERCHARGING OF AN INTERNAL-COMBUSTION ENGINE

FIELD OF THE INVENTION

The present invention relates to a system for the closed-loop control of the supercharging of an internal-combustion engine.

BACKGROUND OF THE INVENTION

European Patent Application No. EP 084 037 describes a system in which the boost pressure is adjusted by a controller to a setpoint value, which is read out of a load- and speed-dependent characteristic map and is subsequently corrected in dependence upon the atmospheric level, the exhaust-gas temperature, the air temperature or the acceleration. The type of internal-combustion engine and application case determines whether a controller having proportional, differential, or integral action is used.

SUMMARY OF THE INVENTION

The object of the present invention is to provide an optimal closed-loop control of the supercharging of the internal-combustion engine.

The present invention has the advantage of rendering possible an optimal closed-loop control of the supercharging of an internal-combustion engine. The system according to the present invention can be used quite advantageously for various types of internal-combustion engines, while entailing very little application expenditure, since it provides for an automatic optimization of the controller. When the closed-loop control is activated, the controller parameters are initially read out of start-up characteristic maps, so that the closed-loop control can be started right away with the best possible controller parameters, and the optimization begins subsequently. Another advantage of the automatic optimization is that tolerances and drifts occurring over time are automatically compensated. Thus, the system according to the present invention is very rugged, has universal applications, and is characterized by a high level of control quality.

DETAILED DESCRIPTION

Figure 1:
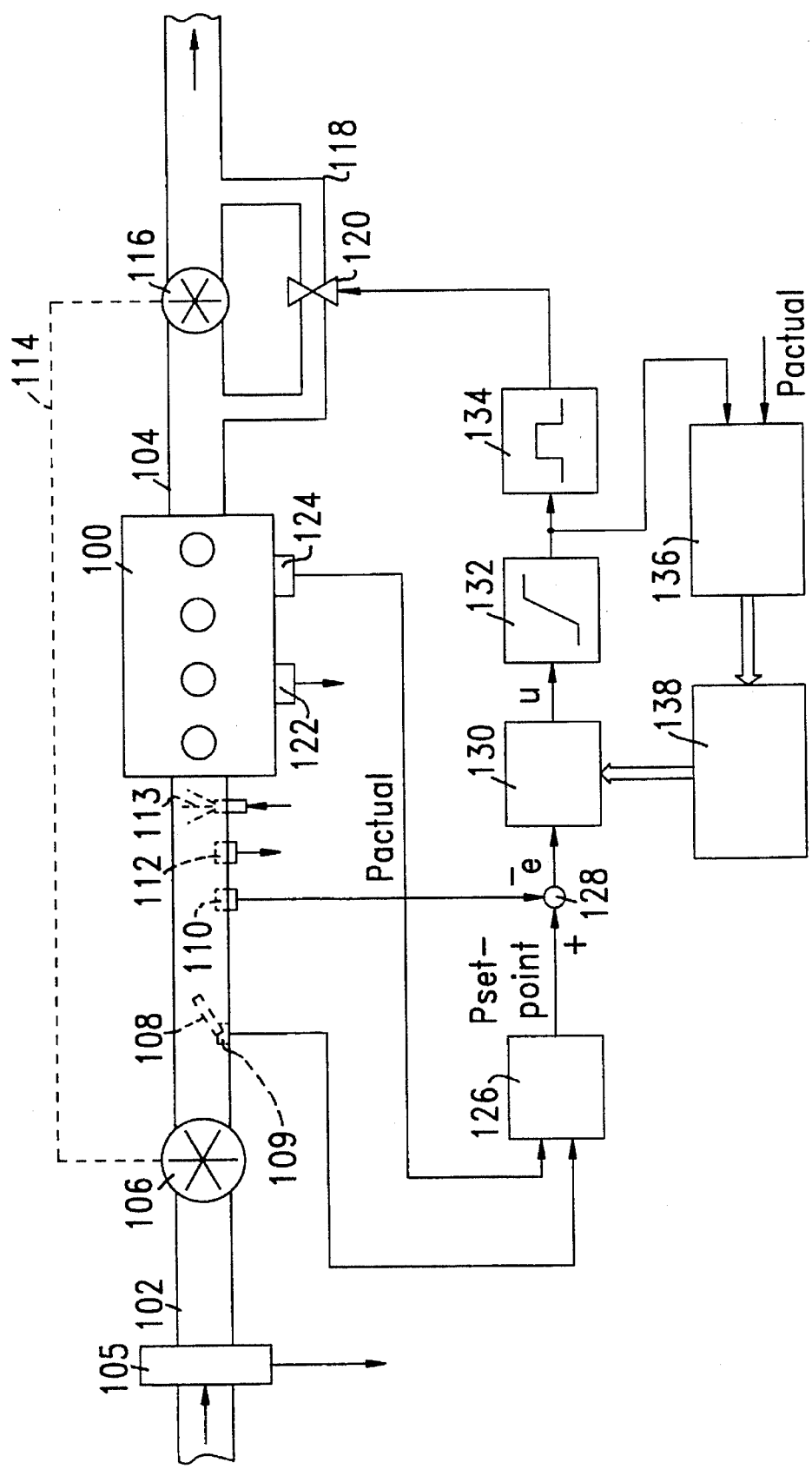
FIG. 1 shows a schematic representation of the system according to the present invention.

FIG. 1 shows an internal combustion engine 100 having an induction section 102 and an exhaust duct 104. Mounted in the induction section 102 - viewed in the direction of flow of the inducted air - are an air-flow sensor or mass air-flow sensor 105, a compressor 106, a throttle valve 108 with a sensor 109 for detecting the opening angle of the throttle valve 108, a pressure sensor 110 for detecting the boost pressure, a temperature sensor 112 for detecting the charge air temperature and at least one injection nozzle 113. The compressor 106 is driven via a connecting means 114 by a turbine 116 arranged in the exhaust duct 104. A bypass line 118 leads around the turbine 116. A bypass valve 120, acting as a final controlling element, is arranged in the bypass line 118. Mounted on the internal-combustion engine 100 are a temperature sensor 122 for detecting the temperature of the coolant, and a speed sensor 124 for detecting the engine speed of the internal-combustion engine 100.

The supercharging of the internal-combustion engine is automatically controlled with the system according to the present invention. To this end, the boost-pressure actual value, Pactual, detected by the boost-pressure sensor 110 can, for example, be automatically adjusted to a boost-pressure setpoint value, Psetpoint, output by a characteristic map 126. The bypass valve 120 is triggered in dependence upon the deviation between Pactual and Psetpoint and, in this manner, the rotational speed of the turbine 116 is influenced. This influencing acts via the connecting means 114 on the compressor 106, which, in turn, influences the boost pressure downstream from the compressor 106, i.e., the boost-pressure actual value, Pactual, detected by the pressure sensor 110. The following will describe the means used for the closed-loop control of the boost pressure and how such an operation is carried out.

The characteristic map 126 has two inputs, the first input being connected to the speed sensor 124, and the second input being connected to the sensor 109 for detecting the opening angle of the throttle valve 108. In dependence upon the signals being applied to both inputs, the characteristic map 126 outputs the boost-pressure setpoint value Psetpoint to a first input of a node 128. The second input of the node 128 is connected to the pressure sensor 110 for detecting the boost-pressure actual value, Pactual. By differentiating between the boost-pressure setpoint value, Psetpoint, and the boost-pressure actual value, Pactual, the node 128 determines a system deviation, e, and makes available a corresponding signal at the output. The output of the node 128 is connected to the input of a controller 130. From the system deviation, e, the controller 130 determines a manipulated variable, u, and outputs this to the input of a limiting stage 132. The limiting stage 132 limits the manipulated variable, u, to a minimal or maximum value and relays the limited system deviation manipulated variable, u, to a trigger stage 134. From the manipulated variable, u, the trigger stage 134 generates a signal for triggering the bypass valve 120 and transmits this signal to the bypass valve 120. The trigger signal can be, for example, a pulse-width-modulated signal. Up until now, the boost-pressure closed loop has been described in general. In the following, components will be described, whose purpose is to optimize the controller 130. The controller 130 is optimized by means of an identification block 136 and a synthetic block 138. The identification block 136 has two inputs. The first input is connected to the output of the limiting stage 132, and the second input to the pressure sensor 110 for detecting the boost-pressure actual value, Pactual, i.e., the limited manipulated variable, u, is applied to the first input, and the boost-pressure actual value, Pactual, to the second input. The output of the identification block 136 is connected to the input of the synthetic block 138. The output of the synthetic block 138, in turn, is connected to a control input of the controller 130. The identification block 136 determines model parameters from the input variables u and Pactual with the aid of a parametric model for the controlled system (internal-combustion engine 100 inclusive of components for influencing the supercharging), for example, a low-pass filter of the nth order with dead time, and with the aid of a suitable method, for example, a recursive least-square fit, in on-line operation and relays these model parameters to the synthetic block 138. From the model parameters, the synthetic block determines corresponding controller parameters and relays these to the controller 130. Details on the operations in the identification block 136 and in the synthetic block 138 are shown in FIG. 2.

Figure 2:
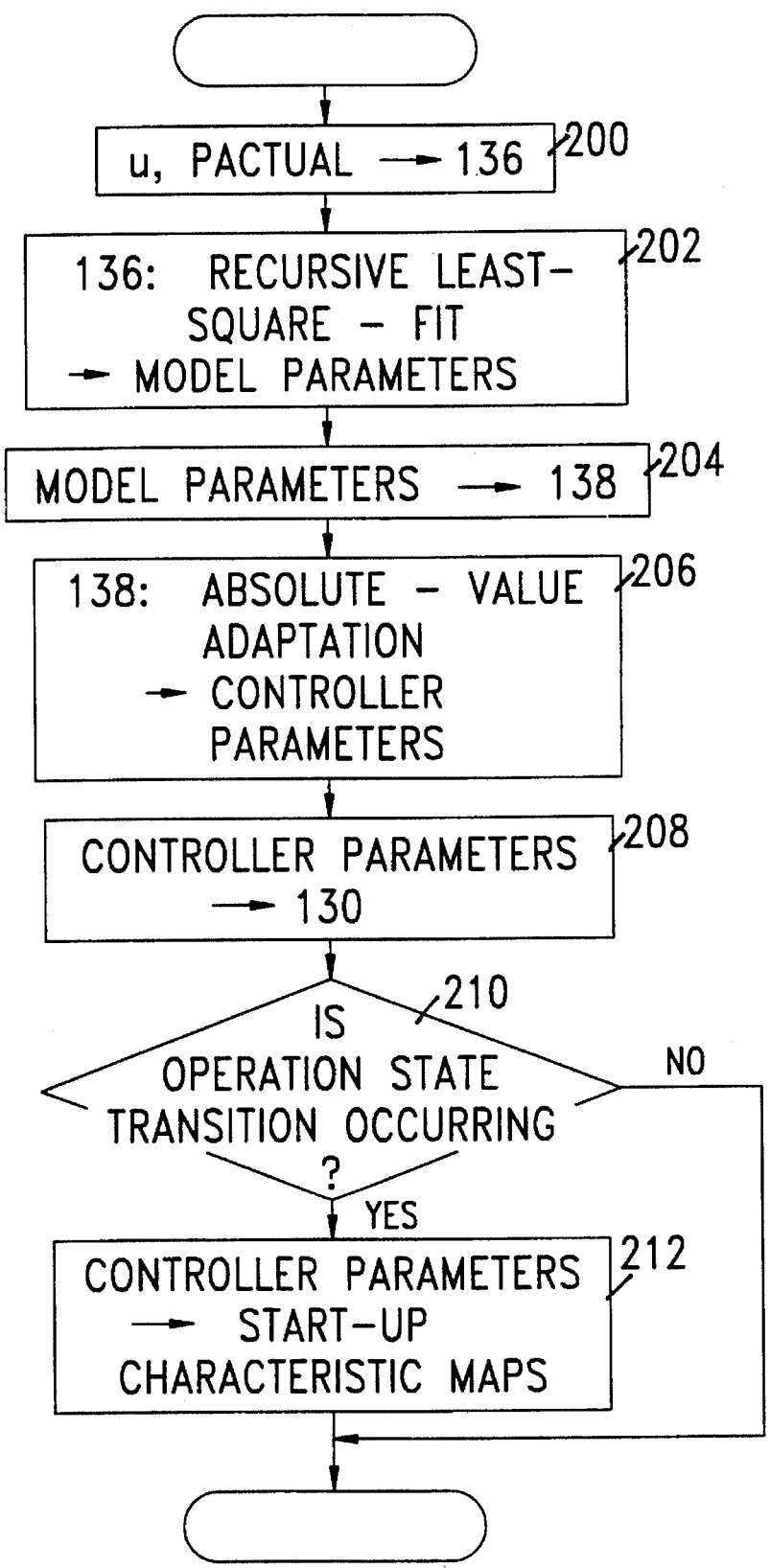
FIG. 2 shows a flow chart representing the method according to the present invention.

FIG. 2 shows a flow chart for clarifying the method of functioning according to the present invention. In a first step 200, the manipulated variable, u, and the boost-pressure actual value, Pactual, i.e., the input variable and the output variable of the controlled system, are read into the identification block 136. Step 200 is followed by a step 202. In step 202, the model parameters of the model used in the identification block 136 are determined for the controlled system from the input variable and the output variable of the controlled system, i.e., it is determined which model parameters have to be introduced into the selected model, to allow the model to generate the signal Pactual from the signal u. For example, a low-pass filter of the nth order with dead time is suitable as a model, and in particular, a low-pass filter of the second order with dead time. When a low-pass filter of the second order with dead time is used, four model parameters are to be optimized. These four model parameters are determined from the signals Pactual and u. The model parameters can be defined, for example, with the help of a recursive least-square fit. Consequently, all of the model parameters are gradually determined or up-dated.

In step 204, which follows step 202, the up-dated model parameters are relayed to the synthetic block 138. Step 206 follows step 204. In step 206, the synthetic block 138 determines the controller parameters from the model parameters. To this end, a generally known method can be applied, for example, absolute-value adaptation, which will not be described in greater detail in the following. Step 206 is followed by step 208, in which the controller parameters determined in step 206 are routed to the controller 130. A step 210 follows step 208.

In step 210, it is queried whether a transition is taking place from a steady-state to a non-steady operating state, and whether the change in speed during this transition is less than a threshold value. When the deviation between Pactual and Psetpoint is greater than a specifiable value, the assumption is made that a transition between a steady-state and a non-steady operating state is at hand. If the query is not fulfilled, then the flow chart cycle is ended. If, on the other hand, the query is fulfilled, then a step 212 follows step 210. Step 212 serves to update the start-up characteristic maps of the controller parameters.

Each time the boost-pressure closed-loop control is activated, the initial values for the controller parameters are determined from the start-up characteristic maps, since current controller parameters are not yet available. The start-up characteristic maps are each plotted over the engine speed and over an operating parameter, which characterizes the initial state of the internal-combustion engine 100 together with a charging device at the instant of activation of the boost-pressure closed-loop control. German Patent Application No. 42 19 791, for example, describes in detail how the operating parameter designated therein by g is determined for the initial state, in particular in FIG. 2 and the corresponding descriptive text. The start-up characteristic maps can also be plotted over the load and the engine speed. To be able to update the start-up characteristic maps, the engine speed and the operating parameter for the output state or the load must initially be determined. The value of the characteristic map belonging to the thus determined value pair is subsequently updated in the start-up characteristic maps by the corresponding controller parameter. The flow chart cycle is ended in step 212.

In one variant, instead of the boost pressure, the air volume or mass air flow detected by the air-flow or mass air-flow sensor 105 is automatically controlled.

What is claimed is:

1. A system for a closed-loop control of a supercharging operation of an internal-combustion engine including a charging device, comprising:

a final controlling element, triggered as a function of a supercharging parameter, for controlling the supercharging operation of the internal-combustion engine;

a controller for producing the supercharging parameter as a function of a deviation between a desired supercharging value and an actual supercharging value and as a function of a plurality of controller parameters establishing a transient behavior of the controller; and a modeling device, having as inputs the supercharging parameter and the actual supercharging value, for modeling the internal-combustion engine, for determining a plurality of model parameters as a function of the inputs, for determining the plurality of controller parameters as a function of the plurality of model parameters, and for transmitting the plurality of controller parameters to the controller.

2. The system according to claim 1, further comprising start-up characteristic maps, the plurality of controller parameters being accessed from the start-up characteristic maps upon activation of the closed-loop control.

3. The system according to claim 2, wherein the start-up characteristic maps include plots of engine speeds of the internal-combustion engine and operating parameters, the start-up characteristic maps characterizing an initial state of the internal-combustion engine inclusive of the charging device at an instant of activation of at least one of the closed-loop control and a load of the internal-combustion engine.

4. The system according to claim 2, wherein the start-up characteristic maps are updated by the controller using the plurality of controller parameters, after a transition from a steady-state to a non-steady operating state, a change of speed of the internal-combustion engine being less than a predetermined value.

5. The system according to claim 1, wherein the model includes a low-pass filter of the nth order with dead time.

6. The system according to claim 5, wherein the low-pass filter is of the second order.

7. The system according to claim 1, wherein the modeling device determines the plurality of model parameters using a recursive least-square-fit method.

8. The system according to claim 1, wherein the modeling device determines the plurality of controller parameters using an absolute-value adaptation method.

9. The system according to claim 1, wherein the controller is a proprotional-plus-integral-plus-derivative (PID) controller.

10. The system according to claim 1, wherein the supercharging parameter is one of a boost pressure, an air volume, and a mass air flow.

\* \* \* \* \*